United States Patent [19]
Davis et al.

[11] 3,916,670
[45] Nov. 4, 1975

[54] ANALYSIS OF COMMINUTED MEAT PRODUCTS

[75] Inventors: Kenneth E. Davis; William M. Watson, both of Troy, Ohio

[73] Assignee: Hobart Corporation, Troy, Ohio

[22] Filed: Oct. 18, 1973

[21] Appl. No.: 407,608

[52] U.S. Cl. .................................. 73/15 B; 73/76
[51] Int. Cl.² .................... G01N 5/04; G01N 25/00
[58] Field of Search ............ 73/15 B, 76; 219/10.55

[56] References Cited
UNITED STATES PATENTS

| | | | |
|---|---|---|---|
| 3,477,274 | 11/1969 | Wald et al. | 73/15 |
| 3,649,729 | 3/1972 | Davis et al. | 73/15 |
| 3,673,852 | 7/1972 | Davis | 73/76 X |
| 3,677,064 | 7/1972 | Simpson | 73/17 |
| 3,813,918 | 6/1974 | Moe | 73/76 |

FOREIGN PATENTS OR APPLICATIONS

| | | | |
|---|---|---|---|
| 1,074,874 | 7/1967 | United Kingdom | 73/15 |
| 1,176,907 | 6/1967 | United Kingdom | 73/17 |

*Primary Examiner*—Herbert Goldstein
*Attorney, Agent, or Firm*—Biebel, French & Bugg

[57] ABSTRACT

Rapid, accurate and almost automatic determination of fat in comminuted meat products, such as beef and the like, is obtained by exposing a preweighed sample to microwave energy for a period of time sufficient to achieve a relatively constant chemical analysis in the residue. During heating, a substantial portion of the fat is melted, leaves the sample and is collected, while a substantial portion of the moisture is vaporized and released directly as vapor. The sample, its residue after heating, less released fat and moisture, and the collected fat are all weighed and the weight is recorded. By cooking the sample using microwave energy to the point short of decomposition of appreciable protein, fat, etc., some fat, moisture and protein remain in the residue. Accurate determination of these components is then calculated automatically because the residue is at a constant chemical analysis relative to the original composition which is directly related to the amount of fat and moisture rendered from the sample.

13 Claims, 6 Drawing Figures

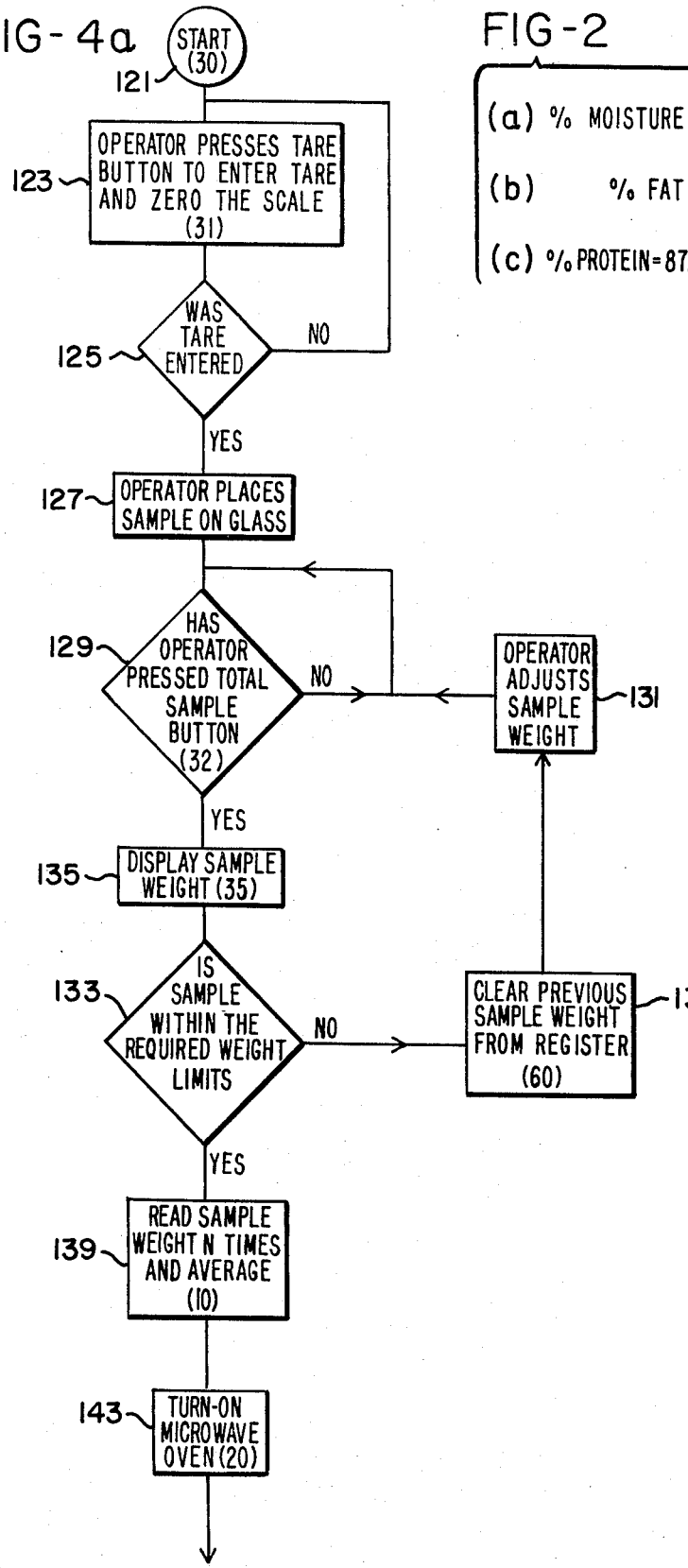

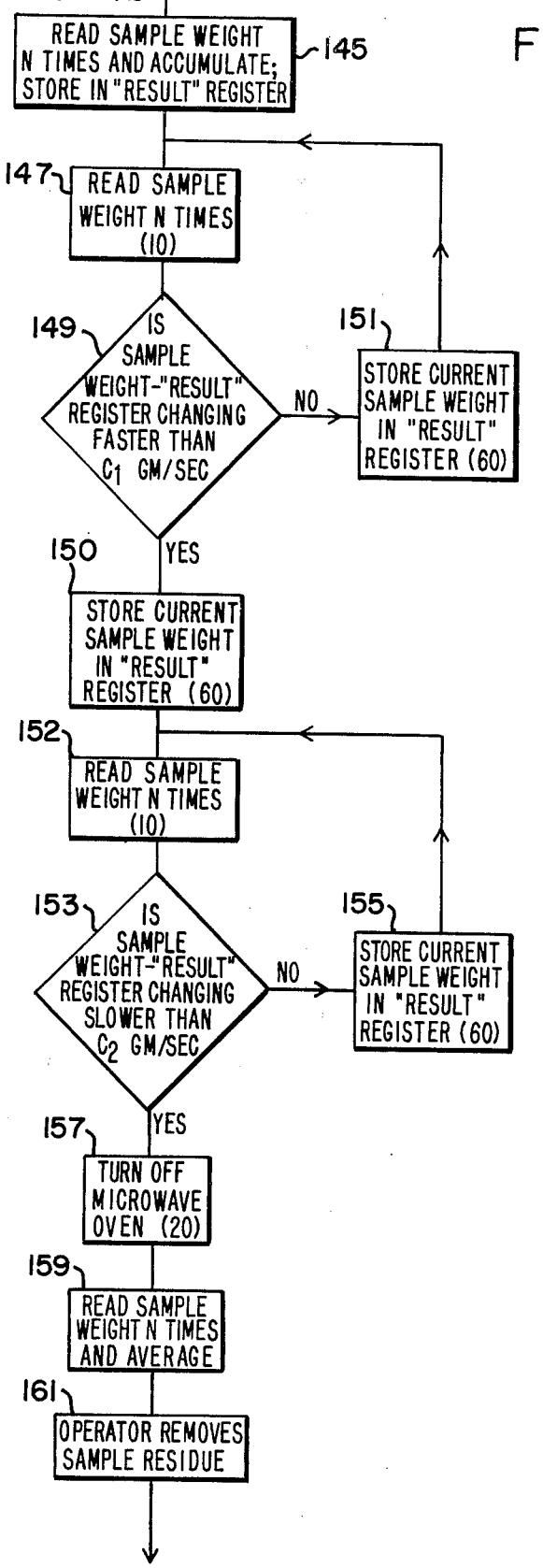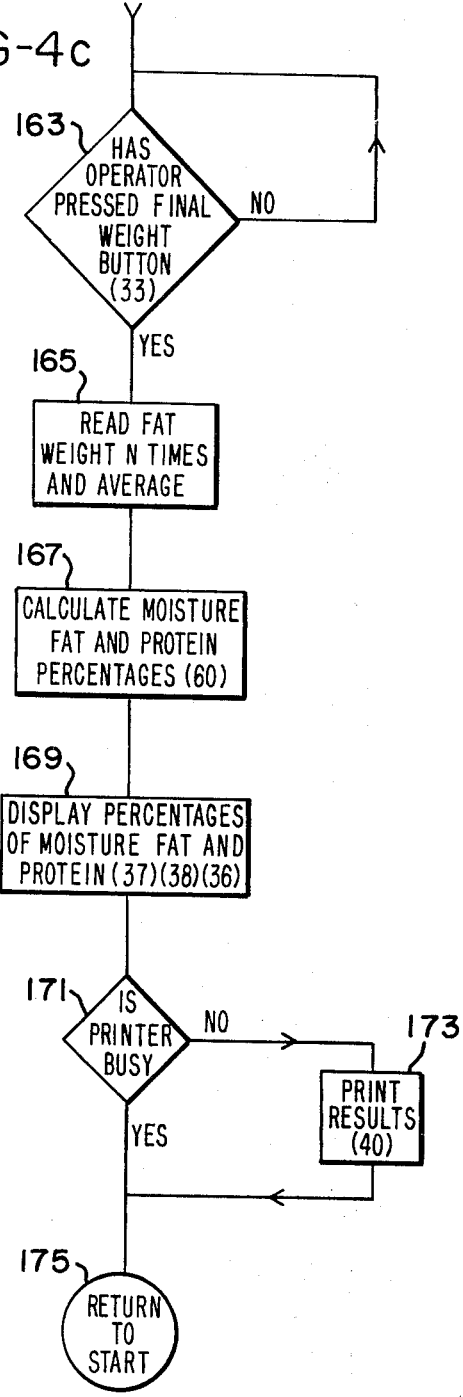

ANALYSIS OF COMMINUTED MEAT PRODUCTS

CROSS REFERENCE TO RELATED APPLICATION

This application is related to copending application Ser. No. 407,667, filed Oct. 18, 1973, filed concurrently herewith, entitled ANALYSIS OF COMMINUTED MEAT PRODUCTS, in the name of Kenneth E. Davis.

BACKGROUND OF THE INVENTION

This invention relates to a method and apparatus for the analysis of comminuted meat products, and more particularly to an improved process for quick and accurate determination of the percentage of fat, moisture and protein in products such as beef and the like. A related method is disclosed in U.S. Pat. No. 3,673,852 issued July 4, 1972 to the assignee of this application.

In meat products which are intended for human consumption and which are comminuted during processing, the problem of accurate control of fat and/or moisture content arises. Typical of such meat products are ground beef, pork, veal and lamb, pork sausage and meat products such as bologna, weiners and liverwurst. The usual procedure is to feed chunk meat into a grinder and then a mixer to bring about intermixing of the meat product. It is after the mixing operation that the composition is checked and adjustments made in the fat to lean ratio and/or moisture content. Following this, the meat is then ground a second time or further processed by mixing and blending with seasoning and the like.

This invention is primarily directed to the analysis of ground beef, the composition of which may vary considerably depending on the grade of meat. For example, regular hamburger may contain between 20 and 30 percent fat, ground chuck around 15 percent, and ground round about 10 percent. By far and away the largest volume of sales is regular ground beef or hamburger meat, the very items in which the fat and moisture has the greatest possible range.

The need for accurate quick fat determination, as well as moisture and protein may be more readily understood from the following comments concerning meat chemistry.

Skeletal meat includes fat whose content varies among meat components and is an independent variable. For example, approximate average percentages of fat, as determined by ether extractions, are as follows:

| Chuck | 10% |
| Brisket (lean sample) | 15% |
| Steer trim | 15%, 35%, 60% |
| Cow trim | 20% |
| Lamb, leg | 20% |
| Beef, flank | 20% |
| Pork, loin | 20% |
| Beef, rump | 25% |
| Pork, shoulder | 35% |
| Fresh ham, adipose tissue | 75% |

Raw fat, by present market prices varies for 15¢ to 25¢ per pound.

Thus, assuming proper sampling techniques, close control of fat results in considerable savings to the packer. For example, assuming a value of $1.25 to $1.35 per pound for lean meat, an error of 1 percent costs 1.0 cent/lb., and a 2 percent error is 2.0 cents/lb. which for a processor of 100,000 pounds a week is over $50,000 a year.

Apart from close cost control by the processor, there is also protection of the consumer in that the amount of fat or moisture may vary in a meat product from day to day, notwithstanding the processor's good faith attempts to control these variables. In many cases of contract sales, fat content is specified and penalties imposed for exceeding the maximum amounts stated. Fat and moisture control have also been important constituents in diet control for hospitals, nursing homes and the like. Finally, it would be advantageous, both to the processor and consumer, to have each packaged comminuted meat product labeled with the percentage of fat, moisture and protein.

Currently, the standard determination of fat is by the "Official Methods of Analysis of the Association of Official Analytical Chemists" (AOAC) ether extraction method which takes about 16 to 24 hours. The fact is that not all fats are ether extractable, while conversely, some non-fat materials are ether extractable. Accordingly, an absolute standard does not exist. Several direct methods are used in addition to the AOAC method, as reported in "Analysis of Fats and Oils," U. C. Mehlenbacher, 1960, The Ganard Press, Champaign, Ill. These methods are all based on chemical procedures and take anywhere from 10 minutes to as long as 16 to 24 hours.

Also used are the indirect methods such as gamma ray penetration, ultrasonics, a resistance heating method, such as U.S. Pat. No. 3,178,929; a specific gravity method, see U.S. Pat. Nos. 3,282,115 and 3,417,625, and a photocell scanning method, see U.S. Pat. No. 3,396,280.

Another method, which is rapid and effective is disclosed in U.S. Pat. No. 3,183,710 assigned to the assignee of this application. This latter method involves direct heating of a comminuted meat sample to melt the fat and to remove the moisture and fat in liquid form.

SUMMARY OF THE INVENTION

By the present invention a simple, quick and accurate method is provided for determination of the fat content of comminuted meat products especially beef. The method of the present invention also enables rapid determination of moisture and protein.

The present invention, as explained in the related application, consists of exposing a sample of comminuted meat of known weight to microwave energy. By using microwave energy, water or moisture in the sample is removed directly as vapor rather than a liquid. Microwave energy effects uniform treating of the sample at all points since heat is generated primarily by rotation of the water molecules in the sample. The heat thus produced "renders" or melts the fats present in the sample which have a melting point below 212°F, primarily lard and tallow fats having a melting point in the range of 90°–124°F. In beef these fats are organic compounds having chain lengths of 11 to 19 carbons, while in pork, the chain length is 13–19 carbons with pork overall containing a greater number of short chain length carbons than beef. By exposure to microwave energy, essentially all of these fats may be rendered without completely charring the original sample. Where the sample is charred, protein cannot be determined accurately since some of the protein is destroyed or converted to products which are vaporized.

In the improvement of this invention the sample is weighed before heating, and its weight is monitored during weight loss due to moisture evaporation. The microwave energy is confined within a cavity, in which a balance is mounted, and the sample along with the fat collection beaker are placed on the balance. Initial heating to defrost a very cold or frozen sample is first accomplished, then after the moisture is at vaporization temperature the heating is continued until the rate of sample weight loss is minimized at a predetermined rate. This is sensed and the heating is terminated automatically.

The fat rendered from the sample is collected and weighed, first with and then without the residue, while the moisture is vaporized. This the solid resident weight plus the weight of fat subtracted from the sample weight provides the weight of moisture vaporized from the sample. Knowing the amount of released moisture, the amount of moisture in the residue may be predicted accurately. The amount of fat is determined by collecting the released fat, essentially free of water, and relating this collected amount to the amount of fat in the sample. Knowing the moisture and the fat, the amount of protein is calculatable in accordance with known formulae accepted in the industry.

Accordingly, it is an object of the present invention to provide an improved and repeatable process, and apparatus therefore, for analysis of comminuted meat products by rendering a sample using microwave energy in order automatically to determine moisture, fat and protein and controlling the application of the microwave energy as a heat source for a period of time which is automatically terminated when essentially all moisture present in the comminuted meat sample has been evaporated; to provide such an apparatus wherein the fat is collected, the solid residue saved and weighed, and automatic calculation of the percentage of fat, moisture and protein proceeds.

Other objects and advantages of the invention will be apparent from the following description, the accompanying drawings and the appended claims.

BRIEF DESCRIPTION OF THE DRAWINGS

FIG. 2 shows calculations involved in carrying out the present invention;

FIGS. 4a, 4b and 4c are flow sheet diagrams of the sequence of steps involved in carrying out the invention.

DESCRIPTION OF THE PREFERRED EMBODIMENT

Figure 1:
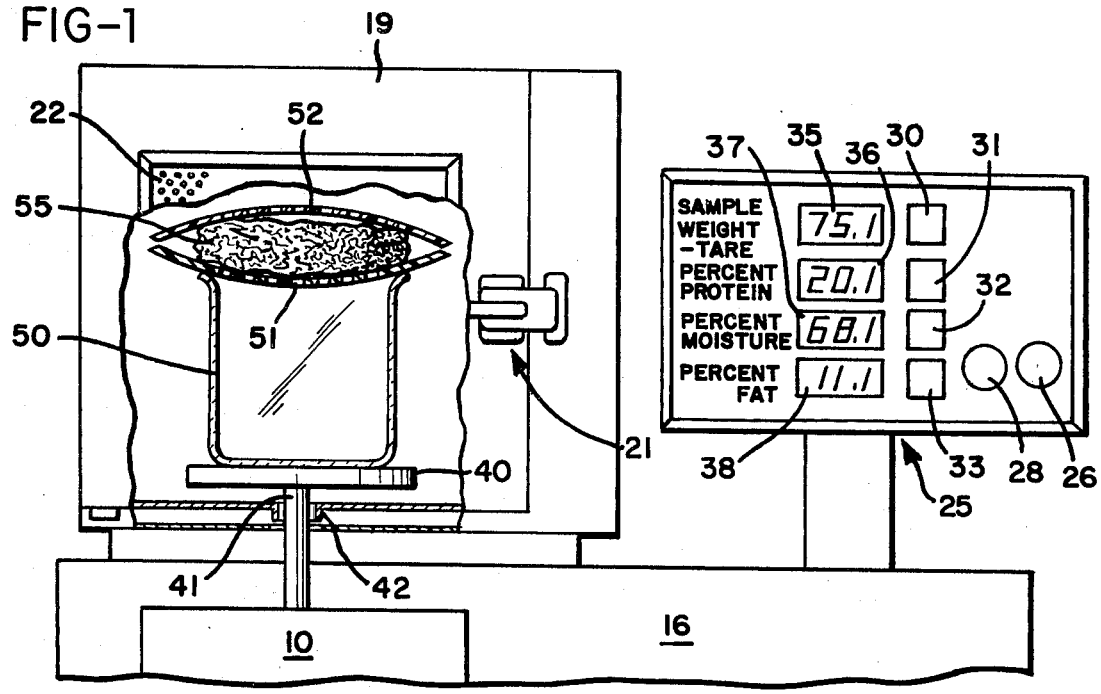
FIG. 1 is a view of the apparatus in accordance with the present invention, partly broken away to show interior details.

The present invention provides for analysis of a comminuted meat sample by rendering or "cooking" the sample to release from it moisture, primarily in the form of vapor, and fat, primarily as liquid which is collected separate from the solid residue. By weighing the sample before and after cooking, and both with and separate from the fat, it is possible to calculate percentage of moisture and percentage of fat. Having reference to certain formulae which are well known in the meat industry, it is possible also to calculate the percentage of protein in the meat.

In a preferred form, the comminuted meat sample is selected such that the sample weight is in the range of 70 to 80 grams. The reason for this is that the "cooking" cycle may be maintained short, e.g., 4 minutes. As a general rule, the heating cycle should be from one to 5 seconds per gram of sample. The term "cooking" in accordance with this invention is meat heated short of charring but far too well cooked to be edible in the normal sense. The use of microwave energy offers the singular advantage of generating heat throughout the sample so that it is uniformly and evenly heated. The energy from the source penetrates the sample causing rotation of dipolar molecules, such as water, thereby generating heat uniformly through the sample. The heat generated is sufficient to liquify normally solid fats, i.e., those having a melting point below 212°F., which then dips from the sample into a collection beaker. The moisture, or water is vaporized and released directly as vapor. By heating the sample short of charring, decomposition of substantial amounts of protein and fat is avoided even though some fat, moisture, and protein remains in the solid residue.

The microwave cooking thus does not remove all of the fat or moisture, but this has been found not to be critical of the determination of the percentages of these components in accordance with the present invention. It has also been observed that some of the protein is removed with the moisture by decomposition and vaporization. Where the cooking time is controlled manually, these factors are compensated for by generating a set of constants which are a function of oven design, i.e., spacing between the microwave energy source and sample, intensity of energy source, and rate of heating and type of meat. Also a factor is the loss of fat, protein, etc., due to spattering and the vaporization of some of these components. Thus, any microwave oven will have a set of constants whicn can be calculated for practicing the present invention, the constants being determined easily by a simple calibration procedure, and being valid for each oven of the same design, although it may vary from one design of oven to the next. The procedure for developing such constants will be discussed below.

The determination of the constants for each of moisture, fat and protein is related to the fact that there is a correlation between the amount of rendered fat and moisture and the actual amount of fat and moisture in the sample. In other words, knowing the amount of fat or moisture rendered enables a prediction of the amount of fat or moisture remaining in the residue. In the case of fat, the correction factor also takes into account the small loss of fat due to vaporization. In general, it has been observed in the case of comminuted beef that the amount of measured moisture can be plotted on a straight curve having a slope of 1.101 when using the oven described. When these data are compared with the data from samples of the same composition analyzed chemically, the Y-intercept is off by −8.254. Thus, by applying a Y-intercept correection factor of −8.254 (to bring the curve to an x-y origin of 0—0) it is possible to trace along a curve having a slope of 1.101 and relate rendered moisture to true moisture in the sample. The reason a negative correction factor is used is because the actual measured amount of moisture loss also includes some fat and protein which are vaporized.

In similar fashion, the curve for fat is generated having a slope of 1.028 with a Y-intercept correstion of −4.46. Again, this enables a direct correlation between rendered fat (measured weight) and true fat content.

Using the same procedures, curves and correction factors may be generated for different meat products, and combinations, and for different oven designs. This is a relatively simple procedure once the principle is understood.

In general the system of the present invention operates as follows. A sample holder assembly is first weighed to determine a tare weight which is recorded. A sample of comminuted meat is then placed on the sample holder assembly which is again weighed and the combined weight of the sample and sample holder assembly are recorded. The sample and sample holder assembly are then placed in the oven and cooked for about 4 minutes, as by setting aa timer.

During the cooking cycle, rendered fat will be collected in the beaker part of the sample holder, while moisture will come off as vapor. At the end of the cooking cycle the oven is shut off and the sample assembly with rendered fat and rendered residue are weighed and this is recorded.

Referring to formula (a) in FIG. 2, A equals the tare weight, B is the sample weight with the tare weight, and C is the weight of the tare, residue and melted fat. The value of B-C thus is the loss in weight due to moisture, and the valve B-A is the sample weight. By dividing the sample weight into the loss due to moisture one obtains a fraction which is multiplied by 100 to provide a percentage representing moisture loss as a percentage of sample weight from which the Y-intercept correction factor previously described is subtracted. The resultant number is multiplied by the reciprocal of the slope to provide an accurate reading of percentage moisture in accordance with the known mathematical procedure for determining X in the slope equation $Y = (mx + b)$ where m represents slope. By knowing the Y-intercept correction and slope of the curve, relating the microwave and chemical methods accurate moisture determinations may be made knowing the amount of moisture rendered during microwave heating. The amount of residual moisture in the rendered sample varies depending on rendered moisture, but is a constant for each specific amount of rendered moisture. For example, the amount of residual moisture at 30 percent rendered moisture will always be an amount ($x$); while the amount of residual moisture at 40 percent rendered moisture will always be ($y$). These figures are easily correlated once the Y-intercept correction factor and slope of the curve are known.

After calculation of moisture, the cooked residue is removed and discarded and the sample holder assembly and collected fat are weighed together. These data are then used to calculate fat and protein as per equations (b) and (c) of FIG. 2. D equals the weight of the fat plus the tare.

The calculation of fat is made by equation (b) of FIG. 2 while protein is calculated from equation (c). The percentages of moisture, fat and protein are recorded by suitable means to maintain a continuing record of these values for successive samples.

The same approach is used in empirically generating a curve for fat correction. For example, one microwave oven successfully utilized is available commercially from The Hobart Manufacturing Company as its Model 1250. For that unit the slope of the fat curve is 1.028 and the Y-intercept correction for fat is +4.462 in the case of comminuted beef; the positive factor indicating that the weighed amount of collected fat is less than it should be. This is probably due to vaporization of some of the fat and to some small amount of fat remaining in the cooked residue. These curves and correction factors were determined by the calibration procedure in which data in accordance with this invention was compared with data from chemical analysis of samples having essentially the same composition. Again, the amount of fat in the residue varies from each different amount of fat rendered from the sample, but the true amount of fat may be related by an accurate prediction of the amount of fat in the residue and that lost through other causes. Formula (b) of FIG. 2 indicates that the amount of fat in the rendered sample residue varies depending on rendered fat, but is a constant for each amount of rendered fat.

The procedure for deriving the correction factors and slopes used in the various calculations and for various comminuted meat products, and combination of comminuted meat products and oven design is generally as follows:

By appropriate sampling techniques various fat content samples of comminuted meat are processed in duplicate samples. One sample is analyzed for moisture, fat and protein by the AOAC methods previously mentioned. The second sample is exposed to microwave energy as previously described using a standard oven with fixed distances of the sample from the energy source. In the microwave analysis, moisture and fat are determined as weight losses while protein is determined on the basis of 100 percent less moisture, fat and ash. This procedure provides two sets of data, one based on the AOAC procedure and the other based on the microwave procedure. A sufficient number of samples of varying composition are analyzed to get representative data over a range of percentages for each component. Once this data is collected, it is analyzed using regression analysis to obtain values for the Y-intercept offset correction and the slope of the curve which relates the microwave and the AOAC methods.

The data from the microwave oven is identified as the y data for each of moisture and fat, while the AOAC data is identified as the $x$ data for each of moisture and fat. The data is analyzed in two separate calculations, the $x$-$y$ data for moisture is one calculation, the $x$-data for fat as a second calculation. 5707.01A In performing a linear regression analysis two principal equations are employed in order that a least squares representation of the data is obtained. This procedure is described at page 157 in the textbook "Analytic Geometry" by Gordon Fuller, second edition, published by Addison-Wesley Publishing Company of Reading, Massachusetts. A computer program for performing this analysis is available through the time shared computer network service sold by the General Electric Company and is identified as a polymonial fit program in the Statistical Analysis System, publication number 5707.01A page 135 in the September 1972 revision. In accordance with the Fuller textbook the two principal equations required are:

1. 0 = the total number of samples times ($a$) minus the sum of all the ($y$) data plus the sum of all the ($x$) data times ($b$)
2. 0 = the sum of all the ($x$) data times ($a$) minus the sums of each ($x$) multiplied by each ($y$) plus the sum of the ($x$)s squared times ($b$)

These two equations are solved for ($a$) and ($b$) which are then used in the following equation:

$$y = (a) \text{ plus } (b) \text{ times } (x)$$

(a). represents the Y-intercept and
(b). indicates the slope of the curve.

This calculation is carried out for each of moisture and fat. In the solution of the calculation the Y-intercept and slope are used in the repective equations (a) and (b) of FIG. 2. Once these factors are calculated for a specific oven design and a type of comminuted meat, they are usable as long as the conditions remain constant, i.e., fixed oven design and meat product.

In a typical example of an analysis in accordance with the present invention a beef meat patty of 75.1 grams, (B-A) value in FIG. 2, was cooked for approximately four minutes with the microwave oven described. The loss in weight due to evaporation of the moisture (B-C) was 33.3 grams while the weight of the fat was 27.8 grams (D-A). Substituting these figures in the calculation, the calculated amount of moisture was 47.77 percent, the calculated amount of fat 40.35 percent and the amount of protein 11.3 percent, using equations (a), (b) and (c) of FIG. 2.

As is understood, these calculations may be automatically carried out by a computer which functions with the scale assembly in the manner already described.

It will be apparent to those skilled in the art that the present system may be used to determine only fat content in contrast to determination of each of moisture, fat and protein, or may be used to determine only moisture. If used to determine only protein, this can be done by determining fat and moisture and utilizing equations (a) and (b) but reporting only the results of equation (c).

Various types of electronic means may be used to perform the weighing and calculating functions previously described. For example, a number of commercially available scale or balances provide digital output of weight information which is easily processed in a small general purpose or special purpose computer. With such equipment the calculations are carried out manually or under the control of a set of instructions programmed into the computer.

It has been discovered that a more nearly automatic system can be provided wherein the weighing, recording and cooling operations are performed in a fairly rapid manner, with minimum attention which can be provided by relatively unskilled labor. This system also provides certain additional manufacturing advantages since it minimizes the need to standardize each type of oven used. The system also provides both an automatic visual readout of percentages of moisture, fat and protein, and if desired an automatic printout of some or all of this information.

Referring to FIG. 1, this automated system includes a weighing balance assembly 10 incorporated in a microwave oven 15 which is supported on a suitable cabinet 16 which also houses part of the balance mechanism. The oven is a standard type of microwave oven using a magnetron with a frequency of 2450 MHz, although other sources may be used, e.g., 900 to 2500 MHz. As previously mentioned, this oven is basically the same unit available commercially from The Hobard Manufacturing Company under the designation Model 1250.

The oven 15 includes a hinged door 19 with a locking handle 21 and a transparent viewing and venting screen 22. Next to the oven is a control and display panel 25 which includes a master power (on-off) switch 26 as well as the following controls. Selector switch 18 is movable to different positions according to the meat being analyzed, e.g., beef, pork, etc. Pushbutton switches control the following functions: switch 30 is a reset switch; switch 31 controls a tare calculation; switch 32 controls a sample weight calculation; and switch 33 controls calculation of the weight of fat rendered from the sample. The display windows each contain three conventional seven-segment electronic numerical display units which are arranged to display three digit values of (b) sample weight less tare, window 35; (b) percent protein, window 36; (c) percent moisture, window 37, and (d) percent fat, window 38. A printer 40 (shown schematically in FIG. 3) is an optional piece of equipment which may be used to record the displayed information and any other desired information such as run numbers and dates.

The weighing balance assembly 10 includes a precision balance such as an Ainsworth Digimetric balance Model 30 DT, with a relatively small electrically conductive platter 40 mounted within the oven cavity on the electrically insulated ceramic or propylene pedestal stem 41 of the balance. The stem passes through the bottom wall of the oven by way of a ¼ wave length choke seal 42 which provides for very low leakage of microwave energy from the opening in the oven bottom wall. Although a weighing scale having the weighing platform separated from the body portion by an elongated single shaft force transmitting element as does the Ainsworth device is preferable for the present apparatus it is possible to employ other forms of weighing apparatus including scales of the type wherein the force transducer is located inside the microwave oven cavity and only electrical wires are conducted to the cavity exterior if suitable changes are made in the appparatus. Scales which are totally mounted in the oven cavity and conduct electrical signals to the exterior would for example require suitable shielding and filtering devides to protect the scale transducers from microwave heating and to prevent microwave radiation from being conducted to the exterior of the heating cavity by the scale signal wiring.

Located on the platter 40 is a sample holder assembly including a glass receptical or beaker 50 over which is placed a perforated dish 51 and a perforated cover dish 52, these dished being of pyrex glass or polytetrafluoroethylene (Teflon, a trademark of the duPont Company) or other material which is non-responsive or mildly responsive to microwave electromagnetic energy. As illustrated, a sample 55 of comminuted meat is supported on dish 51.

Figure 3:
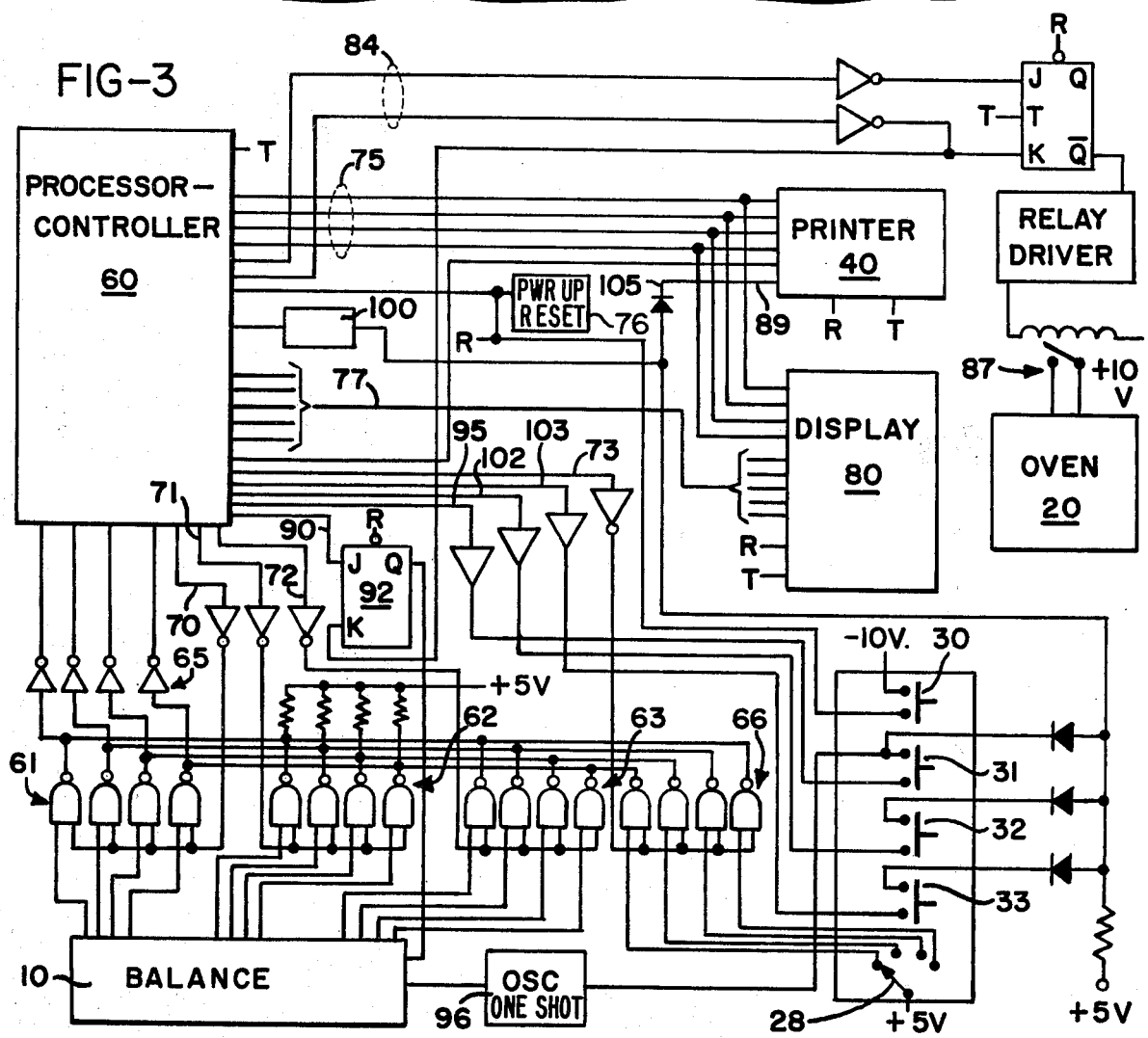
FIG. 3 is a diagram of the control, display, and recording parts of the apparatus.

The balance device includes a ditital electronic output which expresses the weight on the platter in three binary numbers representing weights in tens, units and tenths of a gram. As shown in FIG. 3, these values are gated into a ditial processor-controller 60 via separate banks of AND gates 61, 62, and 63. The outputs of all three banks of AND gates are sequentially connected to the processor-controller unit 60 through inverting amplifiers 65. Also connected to these amplifiers are an additional bank of four AND gates 66 which provide control input information to the processor-controller from the type selector switch 28. Control outputs 70, 71, 72 and 73 from the processor are connected to enable the banks of AND gates in sequence, thus entering the three binary numbers representing a weight value, in sequence, into a memory bank of the processor, and also entering a number representing the type of meat being analyzed.

The processor-controller may be of any suitable commercially available type. One actual embodiment of the invention uses an MCS-4 micro computer available from Intel Corporation, Santa Clara, California and consisting of four large scale integrated circuits, namely (1) a central processor unit circuit, CPU 4004, (2) a read only memory circuit, ROM 4001, (3) a random access memory circuit RAM 4002, and (4) a shift register circuit, SR 4003.

The processor-controller provides a data clock pulse output T, four data output lines 75, and five data sequencing lines 77 including a reset for the display and sequencing signals for indicating which digit of information is available on the data lines 75 at any given instant. These sequencing signals are utilized in the display unit 80 to enable entry of the data from the data lines 75 into the internal memory and seven-segment driver circuits of the display unit. Since the processor-controller, display circuits and other circuits in FIG. 3 are conventional commercially available circuits, details are not shown.

The processor-controller also has output lines 84 which are connected to a switching control J-K flip-flop 85, which controls a relay 87 that turns power to the oven 20 on and off, through a driver circuit 88. This gives the processor control over the "on" time of the oven, for reasons hereafter explained.

The data output lines 75 may also extend to the printer 40 where one is used (the preferred situation). In addition, an enabling circuit line 89 extends from the processor 60 to the printer, whereby the printer is signalled that a sequence of following data signals are to be used to set the type units of the printer.

A further processor output 90 transmits a signal to a pulse stretching flip-flop circuit 92, which provides a data holding signal to the balance 10. Thus when there is an appropriate signal at the processor output 90, the balance output signal lines which are connected to AND gates 61, 62, 63 remain the same despite the possibility that the balance may move. The flip-flop 92 is enabled by the appearance of processor output 90 on its J terminal. The next "T" or clock pulse following this enable causes the flip-flop 92 to set. In a similar manner the appearance of an oven turn-off signal on the lines 84 is used to enable the flip-flop 92 for resetting. The next T or clock pulse following the appearance of an "oven off" signal on the lines 84 causes the flip-flop 92 to reset. The clock or T pulses occur periodically at a rate which is typically near once each ½ millisecond. By means of the flip-flop 92 new data is transmitted from the balance 10 about once each 400 milliseconds.

The processor output 95 leads through an inverting amplifier to the contacts of switch 31, providing a signal to the single shot oscillator 96 which in turn sends a tare recording pulse to the balance. The balance has an internal storage register, and this pulse merely causes the weight then appearing on the balance to be stored in that register for use as the tare weight value. When subsequent weight readings are taken, the balance automatically subtracts from its output the amount stored in the tare register. Closing switch 31 also activates the driver circuit 100, which in-turn ends a signal to the processor 60 indicating the sequence can proceed.

Outputs 102 and 103 from the processor are connected to one contact of switches 32 and 33, respectively. When an output signal is present on one of these lines, after the corresponding switch has been closed by the operator, a signal telling the processor to proceed is passed through the isolating diodes to the driver circuit 100. An output 105 from the printer 40 is also connected to the driver circuit 100. Thus if the printer is operating, the signal to proceed from any one of the switches 31, 32 or 33 will be inhibited until the printer finishes its recording operation.

The reset switch 30, when closed, will produce a reset signal to the processor 60, the flip-flop circuits 85 and 92, the display unit 80, and the printer 40, as indicated by the lines labelled R. Turning on power, by switch 26 also creates a rest pulse by means of the power-up reset circuit 76 so that the system is cleared and readied for an operation.

Overall operation of the heating, weighing, and computing system involves the sequence of steps illustrated in the several parts of FIG. 4 of the drawings. FIG. 4 is arranged in the form used by a programmer of a general purpose digital computer or a micro computer such as the previously mentioned MCS-4 Intel apparatus in selecting instructions from the information supplies by the computer manufacturer. The flow diagram of FIG. 4 defined only the sequence of steps for operating the electrical circuitry of FIG. 3 in terms of the functional acts required during meat analysis.

In FIG. 4 the starting and ending points of the flow diagram are indicated by the circles 121 and 175, while the action steps, including steps requiring operator intervention, are designated by square of rectangular shapes as shown at 123, 127, etc. In a similar manner the decision steps in FIG. 4 are indicated by the diamond shape as shown at 129, 149, etc. The numbers in parenthesis in several of the blocks of FIG. 4 indicate the component in FIG. 3 related to the action or decision represented by that block. For example, the block 123 contains the number 31 in parenthesis and requires the operator to press the tare button which is identified with the number 31 in FIG. 3.

To commence operation as shown in FIG. 4, power is turned on and the sample holder assembly, including the receptacle 50 and the plates 51 and 52, are placed on the scale platter. Turning on power causes a temporary reset of the system by way of reset circuit 76 in FIG. 3. The selector 28 is moved to an appropriate position depending upon the type of meat to be measured the reset button 30 may be pressed by the operator. Reset causes the temporary memory elements, such as the flip-flops 92 and 85 and the memory in the display 80, to be initialized. Once reset has occurred operation of the system as shown in FIG. 4 moves to the block 123 requiring that the operator press the tare button 31 in order that the sample holder be weighed and the weight recorded in the memory of the balance 10.

Upon receiving the tare weight value from balance 10 the processor-controller 60 will halt and wait the placing of a meat sample on the glass 51 as shown at the block 127 in FIG. 4. Following the placing of the meat sample on the glass 51 the operator is required to press the total sample button 32, as indcted in block 129 in FIG. 4. Pressing the total sample button 32 causes the weight of the sample holder and sample to be stord in memory and the total weight displayed as shown in the block 135.

Once the weight of the sample holder and sample is received, th processor-controller 60 performs a check to ascertain that the sample weight is within the desired range, for example 70 to 80 grams, as indicated by block 133. If the sample weight should be below or above the desired range, the steps shown at 137 and 131 occur and the operator is required to adjust the sample weight and again press the total sample button 32.

Once a proper weight of sample has been placed on the scale platter or platform its weight is accurately determinend by a plurality of measurements as shown in block 139. The use of multiple readings for obtaining the weight values which enter into the computations has been found to increase the system accuracy by minimizing the effects of vibration and random weighing errors. The use of ten different weight readings in the block 139 has been found satisfactory with the balance, computer and microwave oven indicted previously. Once the plurality of weight readings are received by the computer there is performed a mathematical calculation to determine the average of these readings.

Once the sample weight has been read the processor-controller 60 applies power to the microwave oven by way of signals transmitted to the flip-flop 85, the relay driver 88, and the relay 87, as indicated in the block 143 in FIG. 4.

Once the microwave oven has been turned on and cooking of the sample has commenced it is necessary to determine the duration of the cooking in order that meaningful and repeatable results are provided by the meat analyzer.

The significance of an accurate oven turn-off is illustrated in the previous example where the released moisture weighed 33.3 grams and the rate of sample wright decrease was 0.9 grams per second at oven turn-off. Under these conditions, an error of just two seconds lateness in removing power from the microwave oven results in an excessive amount of material being removed from the sample and this excesss about if near 6 percent in magnitude. Erroneous oven turn-off can also affect the test results by providing an incorrect amount of rendered fat since the fat, at temperatures near 400°F., is close to its smoke temperature at oven turn-off. The fat is heated by both dielectric heating in it own mass and dielectric heating of the containers 50, 51, 52.

Several techniques have been considered for terminating the microwave oven cooking time, including such arrangements as sensing the escape of moisture from the sample or from the microwave oven cavity, timing the duration of the microwave cooking and cooking the sample until it becomes totally charred. None of these techniques is found however to provide the desirable results obtained by the technique of terminating the cooking when the rate of change of weight of the sample has decreased to a predetermined percentage per unit time of the original weight of the sample. According to a desirable use of this technique the microwave cooking might, for example, be terminated when the rate of weight decrease has fallen to one and two tenths percent (1.2 percent) per second of the original sample weight since a value in this range indicates, in the case of the previously mentioned Hobart microwave oven having a 1250 watt capacity, that substantially all or at least a predetermined amount of the moisture has been driven from the sample. A termination value of the neighborhood of this 1.2 percent per second decrease in weight has been found to provide consistent and repeatable results in the equipment.

Where the original weight of the sample to be cooked is known, as is the case with the 70 to 80 gram sample specified for the preferred embodiment of the invention, the 1.2 percent per second rate of weight decrease reduces to a constant having a value near 0.9 grams per second.

It has been found that certain irregularities experienced in the rate of weight loss in different samples of meant, including the fact that the sample may be partially frozen at the time it is placed in the microwave oven, cause the initial change of weight in the sample to be at an unpredictable rate, that is, the rate of weight loss may initially be either faster or slower than the expected nominal rate. It is also found that following a brief period of this unpredictable rate it is certain that the sample will lose weight at a rate faster than the 1.2 percent per second rate previously mentioned One technique for accomplishing the desired microwave oven turn-off including an accommodation for the unpredictability of the initial weight loss rate is shown in the blocks 145, 147, 149, 150, 151, 152, 153, 155 and 157 in FIG. 4. As indicated in block 145 the sample weight is read a plurality of times, for example 10 times, and the resulting weight values added together and stored in a register or memory which is named the result register. Following storage in the result register the sample weight is again read a plurality of times, such as 10 times, as indicated in the block 147 and the results of this second series of weighings compared on a timed basis with the weight value stored in the result register. If the sample weight is decreasing at a rate faster than some predetermined valve is indicated in the block 149 where the constant C1 may for example be 0.9 grams per second then the processing moves to block 150 wherein the current accumulated total of the sample weights is stored in the "Result" register. If the rate of change of sample weight has not yet increased up to the value of the constant C1 in block 149, the processor repeats the sample weighing operation as indicated by the path through the block 151, with the information in the result register being updated with each repeat to be the last previous set of weight readings obtained. In a similar manner, once the rate of change of sample weight has satisfied the criteria of block 149 the processor-controller 60 commences searching for a rate of change of weight which is slower than the value C2 as shown in the block 153 with the information stored in the result register being updated each time the rate of sample weight is examined. This searching for a rate slower than the constant C2 also commences with reading the sample weight a plurality of times as indicated in the block 152. The constant C2 may also have a value near 0.9 grams per second since as previously indicated it is found that the sample rate of weight change is at first unpredictable than at some fast rate which is ultimately followed by a slower rate.

Once it is ascertained that the sample weight decrease has declined to the predetermined C2 value, the processor turns off the microwave oven by way of a signal set to the flip-flop 85, the relay driver 88, and the relay 87 as indicated in the block 157 of FIG. 4.

After turn off of the microwave oven the sample weight is again read a plurality of times, ten readings being preferred, to determine the amount of moisture and other volatile material which was driven from the sample by the heating. The weight readings indicated in the block 159 are of course important in the sample analysis calculations and are therefore obtained after the microwave oven has been turned off as indicated by the location of the block 157. An attempt to obtain weight readings during turn off of the microwave oven could lead to erroneous results because of possible power line transients and other conditions which could interfere with operation of the processor-controller 60.

Following the weight readings which measure the amount of volatile material driven from the sample by microwave heating, the operator removed the charred sample residue from the scale as indicated in the block 161, and presses the final weight button 33 indicated in the block 163. This operation permits measurement of the collected fat and other liquid extracted from the sample. As indicated in the block 165 the collected fat and liquid is also weighed a plurality of times and the readings averaged.

Once the weight of the vaporized moisture, extracted fat and liquid, and charred remainder are known with regard to the original sample weight, the processor-controller 60 can perform the calculations indicated in the equations of FIG. 2 to ascertain the percentage of moisture, fat and protein in the sample. These calculations are indicated in the block 167 in FIG. 4.

When the percentages of moisture, fat and protein are calculated their numerical values are displayed in the windows 37, 38 and 36 as indicated in the block 169. If a printer 40 is used, a complete record of the analysis can also be provided. Preferably this is accomplished at the end of the system cycle as shown in FIG. 4 by an enabling signal from the processor on line 89 in FIG. 3 after which the data displayed in at least windows 36, 37 and 38 is printed along with an identification (run number of that test, date and type of product which was tested etc.). While the printer is operating a signal from it over line 105 in FIG. 3 prevents the operator from starting a new test sequence.

The basis for the formula (c) in FIG. 2 lies in the equation for percent protein which is well known in the meat industry:

$$\% P = 100 - \% M - \% F - \% a$$

where
$M$ = moisture
$F$ = fat
$a$ = ash

It is also accepted in the meat industry that ash ($a$) is determined by the relation $$a = 0.01 (100 - \% F)$$

where $F$ is again fat

If the above expression for ash and the expressions for percent moisture and percent fat from FIG. 2 are substituted into the above expression for percent protein, the equation shown in FIG. 2 for percent protein is obtained.

A feature of the system shown in FIGS. 1 through 4 is its ability to determine automatically when essentially all or a consistent amount of the moisture and fat has been removed from a sample. As explained previously, although the method may be performed under manual control, it is necessary to perform certain calibrating operations in order to relate the percentage of fat remaining in the sample (or driven off with moisture vapor) to the fat actually removed. In the system disclosed, with the balance platter mounted in the oven cavity, it is possible to monitor weight loss of the sample as it occurs and to respond to this weight loss in a desirable manner.

Another feature of the invention is that it is able to accommodate the fact that as the sample is heated it may go through a defrosting period. As indicated above, this is accomplished by incorporating into the processor the ability to respond to the rate of change of the sample weight upon two different occasions in the heating cycle.

While the methods and forms of apparatus herein described constitute preferred embodiments of this invention it it to be understood that the invention is not limited to these precise methods and forms of apparatus, and that changes may be made therein without departing from the scope of the invention.

What is claimed is:

1. A method for controlling the duration of dielectric heating energy applied to a sample of food material containing components which are heat releasable in both vapor and liquid form to obtain uniform repeatable processing of said sample, said method comprising the steps of:

locating said sample on the platform of a weighing scale during the application of heating energy, collecting the components rendered as liquid separately from the sample, monitoring the weight of said sample during the application of heating energy at least from the time said sample begins to lose weight, due to release of vaporized components, terminating the application of heating energy to said sample when the rate of change of weight of said sample decreases to a predetermined percentage per unit time of the original weight thereof.

2. The method of claim 1 further including the step of selecting said sample to have a predetermined weight prior to the application of said heating energy.

3. The method of claim 1 wherein said heating energy is derived from a microwave frequency electromagnetic field.

4. The method of claim 1 wherein said step of terminating the application of heating energy is accomplished after the rate of change of weight of said sample has increased to a first predetermined percentage per unit time of the original weight thereof and then decreases to a second predetermined percentage per unit time of the original weight thereof.

5. The method of claim 4 wherein said first and second predetermined percentages of the original weight are equal.

6. The method of claim 1 wherein said mass of organic material has a predetermined weight prior to the application of said heating energy, said heating energy is microwave frequency electromagnetic energy, and said step of terminating the application of heating energy is accomplished after the rate of change of weight of said organic material has increased to a first predetermined unit of weight per unit of time and then decreased to a second predetermined unit of weight per unit of time.

7. The method of claim 1 wherein said step of monitoring the weight of said sample includes determining the weight of said sample a plurality of times and mathematically deriving a representative value from said determinations.

8. The method of claim 1 further including the steps of determining if the initial weight of said sample before heating is within a predetermined range of weight and inhibiting the heating of said sample if said material is outside of said predetermined range of weight.

9. The method of claim 1 wherein said steps of monitoring the weight and terminating the application of heating are controlled by an electronic computer apparatus.

10. The method of claim 1 wherein said sample is a mass of comminuted meat.

11. In an apparatus for determining the amount of moisture and/or fat and/or protein in a meat product sample which includes a sample holder assembly including means for collecting and holding rendered fat separate from the sample, dielectric heating means including an enclosure for receiving said sample and sample holder for rendering and holding fat from the sample and also releasing moisture as vapor which is dispersed from the sample, scale means having sample holder receiving means located in said enclosure for determining the weight of the sample before, during and after heating and the weight of rendered fat and providing weight output signals indicative of said weights, the improvement comprising:

computing and display means connected to receive said weight output signals and to record said signals from said scale means indicating loss of moisture from said sample, control means connected with said heating means and said computing and display means for terminating the application of heat to said sample in response to a predetermined decline in the rate of change in said weight signal indicative that a predetermined amount of moisture has been vaporized from the sample.

12. The apparatus of claim 11 wherein said computing and display means includes sensing means responsive to a first rate of change of said weight output signal and responsive to a second rate of change of said weight output signal and means connected with said sensing means for supplying a heat terminating signal to said control means following the sequence of said rate of change attaining a first predetermined value followed by a second predetermined value.

13. The apparatus of claim 11 wherein said computing and display means includes means for computing the composition of said meat product sample in response to the weight of moisture and fat extracted therefrom during heating by said heating means.

* * * * *

UNITED STATES PATENT AND TRADEMARK OFFICE
CERTIFICATE OF CORRECTION

PATENT NO. : 3,916,670
DATED : November 4, 1975
INVENTOR(S) : Kenneth E. Davis; William M. Watson It is certified that error appears in the above-identified patent and that said Letters Patent are hereby corrected as shown below:

Column 1, line 63, "$15^6$ to $25^6$" should be --15¢ to 25¢--.
Column 3, line 15, "this" should be --thus--.
Column 4, line 57, "correction" is misspelled; line 66, "correction" is misspelled.
Column 5, line 14, cancel "a"; line 25, "valve" should be --value--.
Column 6, line 45, delete "5707.01A".
Column 7, line 45, "cooling" should be --cooking--; line 68, "18" should be --28--.
Column 8, line 10, "(b)" should be --(a)--; line 37, "divide" should be --devices--; line 45, "dished" should be --dishes--.
Column 10, line 23, "supplies" should be --supplied--; line 30, "of" should be --or--; line 66, "te" should be --the--.
Column 11, line 36, "about if" should be --amount is--; line 42, "it" should be --its--.
Column 12, line 8, "meant" should be --meat--; line 30, "valve" should be --value--.
Column 13, line 8, "removed" should be --removes--.

Signed and Sealed this thirtieth Day of March 1976

[SEAL]

Attest:

RUTH C. MASON
Attesting Officer

C. MARSHALL DANN
Commissioner of Patents and Trademarks